United States Patent
Mudrock et al.

(10) Patent No.: US 11,207,650 B1
(45) Date of Patent: Dec. 28, 2021

(54) HYDROPROCESSING REACTOR INTERNALS HAVING REDUCED HEIGHT

(71) Applicant: UOP LLC, Des Plaines, IL (US)

(72) Inventors: Rebecca Mudrock, Wauconda, IL (US); Pengfei Chen, Glenview, IL (US); Zhanping Xu, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/038,049

(22) Filed: Sep. 30, 2020

(51) Int. Cl.
- *B01J 8/00* (2006.01)
- *B01J 8/02* (2006.01)
- *B01J 8/04* (2006.01)

(52) U.S. Cl.
CPC ......... *B01J 8/0492* (2013.01); *B01J 8/0278* (2013.01); *B01J 8/0453* (2013.01)

(58) Field of Classification Search
CPC . B01J 8/00; B01J 8/020278; B01J 8/04; B01J 8/0446; B01J 8/0449; B01J 8/0453; B01J 8/0492; B01J 8/02; B01J 8/0278
See application file for complete search history.

(56) References Cited

U.S. PATENT DOCUMENTS

| | | | |
|---|---|---|---|
| 5,635,145 A | 6/1997 | Den Hartog et al. | |
| 5,837,208 A | 11/1998 | Grott et al. | |
| 5,935,413 A | 8/1999 | Boyd et al. | |
| 6,183,702 B1 | 2/2001 | Nguyen et al. | |
| 6,338,828 B1 | 1/2002 | Stupin et al. | |
| 6,881,387 B1 | 4/2005 | Jacobs et al. | |
| 6,984,365 B2 | 1/2006 | Nelson et al. | |
| 7,074,372 B2 | 7/2006 | Muldowney et al. | |
| 7,078,002 B2 | 7/2006 | Van Vliet et al. | |
| 7,112,312 B2 | 9/2006 | Chou | |
| 7,601,310 B2 | 10/2009 | Breivik et al. | |
| 7,674,439 B2 | 3/2010 | Jacobs et al. | |
| 8,017,095 B2 | 9/2011 | Kemoun et al. | |
| 8,181,942 B2 | 5/2012 | Sechrist | |
| 8,673,246 B2 | 3/2014 | Chen et al. | |
| 9,079,141 B2 | 7/2015 | Boyak et al. | |
| 9,211,516 B2 | 12/2015 | Lesniak et al. | |
| 9,295,959 B2 | 3/2016 | Xu et al. | |
| 9,321,022 B2 | 4/2016 | Xu | |
| 9,321,023 B2 | 4/2016 | Xu | |
| 9,566,559 B2 | 2/2017 | Xu et al. | |
| 9,757,703 B2 | 9/2017 | Zahirovic et al. | |
| 9,764,299 B2 | 9/2017 | Beard et al. | |
| 10,589,244 B1 | 3/2020 | Xu | |

(Continued)

FOREIGN PATENT DOCUMENTS

| | | |
|---|---|---|
| CA | 2887392 A1 | 4/2014 |
| CN | 107405591 A | 11/2017 |

(Continued)

*Primary Examiner* — Natasha E Young

(57) ABSTRACT

The hydroprocessing reactor quench zone internals comprise a collection tray, a mixing chamber, a ring quench distributer, a rough liquid distribution tray, and a vapor-liquid distribution tray. The rough liquid distribution tray has a central pan for receiving vapor and liquid out of the mixing chamber and multiple fluid distribution troughs attached to the central pan that extended radially outwards with the outer end close to the reactor shell. The fluid distribution troughs can include at least one longitudinal baffle, or at least one cross baffle, or both, and optionally an end baffle. The baffles improve the liquid and/or vapor flow in the rough liquid distribution tray.

20 Claims, 2 Drawing Sheets

(56) References Cited

U.S. PATENT DOCUMENTS

| | | |
|---|---|---|
| 10,668,442 B1 | 6/2020 | Xu |
| 2011/0123410 A1 | 5/2011 | Augier et al. |
| 2014/0144121 A1 | 5/2014 | Legare et al. |
| 2014/0231308 A1 | 8/2014 | Muller |
| 2015/0071834 A1 | 3/2015 | Korsten et al. |
| 2016/0186075 A1 | 6/2016 | Treese |
| 2017/0173547 A1 | 6/2017 | Maas et al. |
| 2018/0057757 A1 | 3/2018 | Song et al. |

FOREIGN PATENT DOCUMENTS

| | | |
|---|---|---|
| WO | 2014056935 A1 | 4/2014 |
| WO | 2016155938 A1 | 10/2016 |

HYDROPROCESSING REACTOR INTERNALS HAVING REDUCED HEIGHT

BACKGROUND

A wide variety of processes use co-current flow reactors, where a fluid or fluids flow over a fixed bed of solid particulate materials, to provide for contact between the fluid and solid particles. In a reactor, the solid may comprise a catalytic material on which the fluid reacts to form a product. The fluid can be a liquid, vapor, or mixture of liquid and vapor, and the fluid reacts to form a liquid, vapor, or a mixture of a liquid and vapor. The processes cover a range of processes, including hydrocarbon conversion, hydrocracking and hydrotreating.

Co-current reactors with fixed beds are constructed such that the reactor allows for the fluid to flow over the catalyst bed. When the fluid is a liquid, a vapor, or liquid and vapor mixture, the fluid is usually directed to flow downward through the reactor. Multibed reactors are also frequently used, where the catalyst beds are stacked over one another within a reactor shell. Typically, they are stacked with some space between the beds.

The interbed spaces are often created to provide for intermediate treatment of the process fluid, such as cooling, heating, mixing and redistribution.

In exothermic catalytic reactions, the control of fluid temperature and distribution is important. The temperature and composition of the fluids from an upper catalyst bed and from outside of reactor should be well mixed before being distributed to the lower catalyst bed. Initial poor temperature and composition distribution at top of a catalyst bed can persist or grow as the process fluids move down the reactor. Hot spots can develop and cause rapid deactivation of the catalyst and shorten the reactor operation cycle length. The space between catalyst beds is for the injection of a quench gas or liquid and for fluid mixing and distribution. In hydrocarbon processing, the quench gas is often a cool hydrogen/hydrocarbon stream. However, cooling a fluid without controlling the mixing and distribution leads to uneven reactions and uneven temperature distribution in subsequent catalyst beds. And complex mixing and distribution systems takes up valuable space in a reactor chamber holding multiple catalyst beds.

There is always a desire for minimizing the space between catalyst beds for introducing a quench fluid, mixing the vapor and liquid along with the quench fluid, and distributing the fluids. Particularly, for existing hydroprocessing reactors, it is often desired to reduce the space between catalyst beds for increasing catalyst loading so that the reactor throughput or operating cycle time or both can be increased. Even for new reactors, it is often desired to reduce the overall size of the reactors to reduce capital expenditure and the profile of the reactor in a processing plant. Therefore, it is desirable to provide for good mixing and distribution of fluids between adjacent catalyst beds in a relatively short interbed space.

The design of reactors to overcome these limitations can save significantly on the valuable space within a reactor for maximizing catalyst loading. Further, it is often desirable to revamp existing reactors to improve processes with the same or reduced quench zone space between catalyst beds. New reactor internals that improve the utilization of the space within a reactor shell can provide significant cost savings, and allow for revamps of existing reactors to meet new operational and regulatory requirements.

DESCRIPTION OF THE INVENTION

Figure 1:
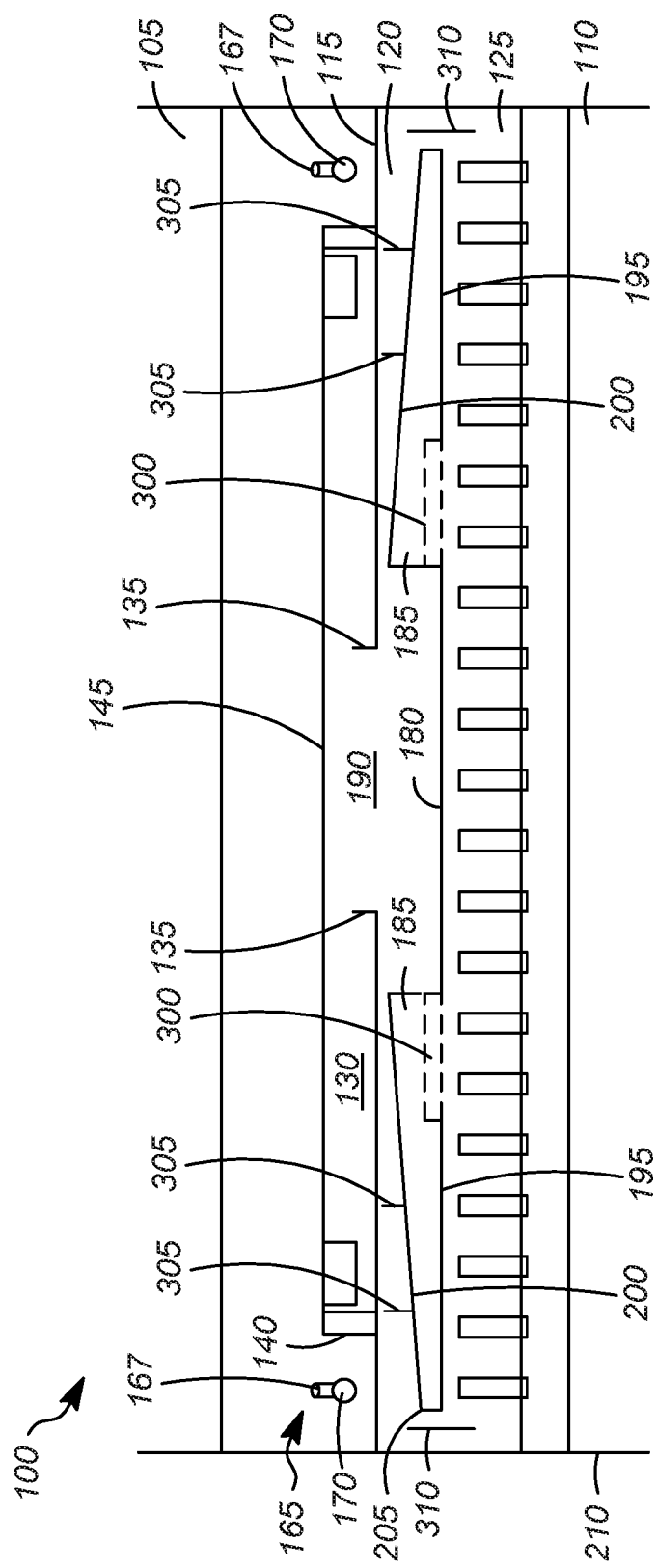
FIG. 1 is a cross section of one embodiment of the hydroprocessing reactor internals of the present invention.

Minimizing hydroprocessing reactor internals (HRI) height and maximizing catalyst loading in revamp of existing reactors help increase production rate and/or operation cycle length which improves the economics of the process.

The hydroprocessing reactor quench zone internals comprise a collection tray, a mixing chamber, a ring quench distributor, a rough liquid distribution tray, and a vapor-liquid distribution tray. Fluid mixing occurs mainly in the mixing chamber.

The collection tray is a plate with a central opening.

The mixing chamber is above the collection tray and surrounds the central opening for downward liquid flow, or vapor flow, or both vapor and liquid flow.

A ring quench distributor is located above the fluid collection tray between the mixing chamber and the reactor shell to eliminate the vertical space occupied by the distributor. The injectors attached to the ring quench distributor manifold are positioned above the top plate of the mixing chamber and oriented tangentially to the ring manifold for injecting quench fluid while avoiding liquid from entering the distributor. Most of the vapor and part of the liquid enter the mixing chamber tangentially through the spillways in the top of the mixing chamber, while the rest of the liquid and vapor enters the mixing chamber tangentially through openings in the side of the mixing chamber with directional baffles.

The rough liquid distribution tray has a central pan for receiving vapor and liquid out of the mixing chamber and multiple fluid distribution troughs (e.g., 3 to 12) attached to the central pan that extended radially outwards with the outer end near (e.g. less than 12 in.) the reactor shell. The fluid distribution trough bottom may be solid or have openings (e.g. holes or slots) for liquid flow to the vapor-liquid distribution tray below. The fluid distribution trough has side walls sloped downward from the central pan to the fluid distribution trough outer end. The trough outer end may have a wall for retaining liquid within the fluid distribution trough for liquid distribution when the trough bottom has openings. Vapor and liquid flow radially from the central pan to the distribution troughs. Vapor leaves the fluid distribution trough over the top of the sloped walls and the open spaces between the fluid distribution troughs and the reactor shell.

The rough liquid distribution tray assists the vapor-liquid distribution tray for uniform fluid distribution to a lower catalyst bed.

In some cases, it has been found that the momentum of swirling fluid flow induced from the mixing chamber was carried onto the liquid distribution troughs in the rough liquid distribution tray. This can cause sloshing of the liquid to one side of the fluid distribution troughs. By adding longitudinal baffles to the inlet of the fluid distribution troughs in the rough liquid distribution tray, the swirling fluid flow from the mixing chamber is broken, and liquid is directed more evenly across the width of the fluid distribution trough and distributed more uniformly to the vapor-liquid distribution tray below. This reduces flow turbulence on the vapor-liquid distribution tray and improves fluid distribution to the catalyst bed below. The baffles are simple to fabricate and do not add to the part count or complicate installation of the HRI.

There can be at least one longitudinal baffle extending from the central pan toward the outer end of the fluid distribution trough. The longitudinal baffles, which can be solid or perforated, typically have a length between 10% and 50% of the length of the fluid distribution trough, or 20% to 30% of the length of the trough. In some embodiments, the longitudinal baffles may extend the entire length of the fluid distribution trough. The height of the baffle is typically about 1 inch or more, and can extend any height up to the bottom of the collection tray. The number, height and length can be adjusted to optimize the uniformity of the liquid across the width of the fluid distribution trough while trying to minimize the amount of material in the baffles.

In some cases, the radial vapor flow along the fluid distribution trough is so strong that a large portion of vapor directly impinges on the reactor wall. This generates a high static pressure zone near the reactor wall. As a result, the liquid level near the reactor wall is much lower than that of the inner region of the vapor-liquid distribution tray. This would impact the uniformity of fluid distribution through the distributors close to the reactor wall, especially when the vapor flow rate is high and the liquid flow rate is low. At least one cross baffle which extends between the side walls can be added to reduce the amount of vapor directly impinging the reactor wall, thus making the liquid level in the vapor liquid distribution tray more uniform. The cross baffles, which can be solid or perforated, gradually deflect the vapor to the space between fluid distribution troughs along the circumferential direction. The cross baffles are perpendicular to the direction of vapor flow (radial) in the fluid distribution trough and are positioned at a location between about 25% and about 75% of the length of the fluid distribution trough. They are typically as wide as the fluid distribution trough, although they could be narrower or wider if desired. The cross baffles may be positioned on top of the side walls and extend up to the bottom of the collection tray. The number of cross baffles and opening ratio of perforated holes can be optimized. There are typically three or less cross baffles.

In some embodiments, there can be an end baffle positioned between the outer end of the fluid distribution trough and the reactor wall. The end baffle directs liquid downwards to the vapor-liquid distribution tray below. The baffle can have a horizontal lip at the top for preventing liquid from being splashed to the reactor wall. The end baffle may be attached to the fluid distribution trough, the vapor-liquid distribution tray, or part to the vapor-liquid distribution tray and part to the fluid distribution trough. The end baffle is typically spaced about 1 inch to about 5 inches from the end of the fluid distribution trough depending on the liquid volumetric flow and fluid distribution trough design. It may extend up to about 3 inches above and below the end of the fluid distribution trough. The end baffle can be straight, or it can be curved to follow the reactor shell. The width of the end baffle is preferably wider than the fluid distribution trough so that the liquid can be spread to a wider area on the vapor-liquid distribution tray to minimize disturbance of the liquid pool on the vapor-liquid distribution tray.

The longitudinal and end baffles improve liquid distribution across the distribution troughs. The cross baffles improve the vapor distribution through the spaces between the fluid distribution troughs, thus reducing the radial pressure drop in the vapor-liquid distribution tray. These baffles reduce local momentum of fluid flow and improve fluid distribution to the vapor-liquid distribution tray below. This allows a uniform fluid distribution to lower catalyst bed through the distributors in the vapor-liquid distribution tray.

One aspect of the invention is a device for the mixing and distribution of fluid between catalyst beds. In one embodiment, the device comprises: a collection tray comprising a central opening, the collection tray in fluid communication with a bottom of an upper catalyst bed; a rough liquid distribution tray comprising a central pan in fluid communication with the central opening of the collection tray and a plurality of fluid distribution troughs in fluid communication with the central pan and extending radially outwardly therefrom, the fluid distribution troughs comprising a bottom, and side walls, each fluid distribution trough having at least one longitudinal baffle extending from the central pan toward an outer end of the fluid distribution trough or at least one cross baffle extending between the side walls or both, the outer end of the fluid distribution trough being spaced apart from a reactor wall; and a vapor-liquid distribution tray in fluid communication with the rough liquid distribution tray and with a top of a lower catalyst bed.

In some embodiments, the at least one longitudinal baffle has a length of 10% to 50% of a length of the fluid distribution trough.

In some embodiments, the rough liquid distribution tray has 3 to 12 fluid distribution troughs.

In some embodiments, each fluid distribution trough has three longitudinal baffles.

In some embodiments, the at least one cross baffle is positioned at a location between 25% and 75% of a length of the fluid distribution trough.

In some embodiments, each fluid distribution trough has three or less cross baffles.

In some embodiments, the at least one longitudinal baffle is perforated or the at least one cross baffle is perforated or both.

In some embodiments, the bottom of the fluid distribution troughs has openings therethrough.

In some embodiments, the bottom of the fluid distribution troughs is solid.

In some embodiments, the fluid distribution trough further comprising an end wall connected to the side walls.

In some embodiments, the fluid distribution trough further comprising an end baffle positioned between the outer end of the fluid distribution trough and the reactor wall.

Another aspect of the invention is a device for the mixing and distribution of fluid between catalyst beds. In one embodiment, the device comprises: a collection tray comprising a central opening, the collection tray in fluid communication with a bottom of an upper catalyst bed; a rough liquid distribution tray comprising a central pan in fluid communication with the central opening of the collection tray and a plurality of fluid distribution troughs in fluid communication with the central pan and extending radially outwardly therefrom, the fluid distribution troughs comprising a bottom, and side walls, each fluid distribution trough having at least one longitudinal baffle extending from the central pan toward an outer end of the fluid distribution trough and at least one cross baffle extending between the side walls, the side walls sloping downward from the central pan to the outer end, the outer end of the fluid distribution trough being spaced apart from a reactor wall; and a vapor-liquid distribution tray in fluid communication with the rough liquid distribution tray and with a top of a lower catalyst bed.

In some embodiments, the at least one longitudinal baffle has a length of 10% to 50% of a length of the fluid distribution trough.

In some embodiments, each fluid distribution trough has three longitudinal baffles.

In some embodiments, the at least one cross baffle is positioned at a location between 25% and 75% of a length of the fluid distribution trough.

In some embodiments, each fluid distribution trough has three or less cross baffles.

In some embodiments, the bottom of the fluid distribution troughs has openings therethrough.

In some embodiments, the bottom of the fluid distribution troughs is solid.

In some embodiments, the fluid distribution trough has an end wall at the outer end.

Another aspect of the invention is a device for the mixing and distribution of fluid between catalyst beds. In one embodiment, the device comprises: a collection tray comprising a central opening, the collection tray in fluid communication with a bottom of an upper catalyst bed; a rough liquid distribution tray comprising a central pan in fluid communication with the central opening of the collection tray and a plurality of fluid distribution troughs in fluid communication with the central pan and extending radially outwardly therefrom, the fluid distribution trough comprising a bottom, and side walls, each fluid distribution trough having at least one of: at least one longitudinal baffle extending from the central pan toward an outer end of the fluid distribution trough; at least one cross baffle extending between the side walls; and an end baffle positioned between the outer end of the fluid distribution trough end and a reactor wall; wherein the at least one longitudinal baffle has a length of 10% to 50% of a length of the fluid distribution trough, wherein the at least one cross baffle is positioned at a location between 25% and 75% of the length of the fluid distribution trough, the side walls sloping downward from the central pan to the outer end of the fluid distribution trough, the end of the fluid distribution trough being spaced apart from the reactor wall; and a vapor-liquid distribution tray in fluid communication with the rough liquid distribution tray and with a top of a lower catalyst bed.

Figure 2:
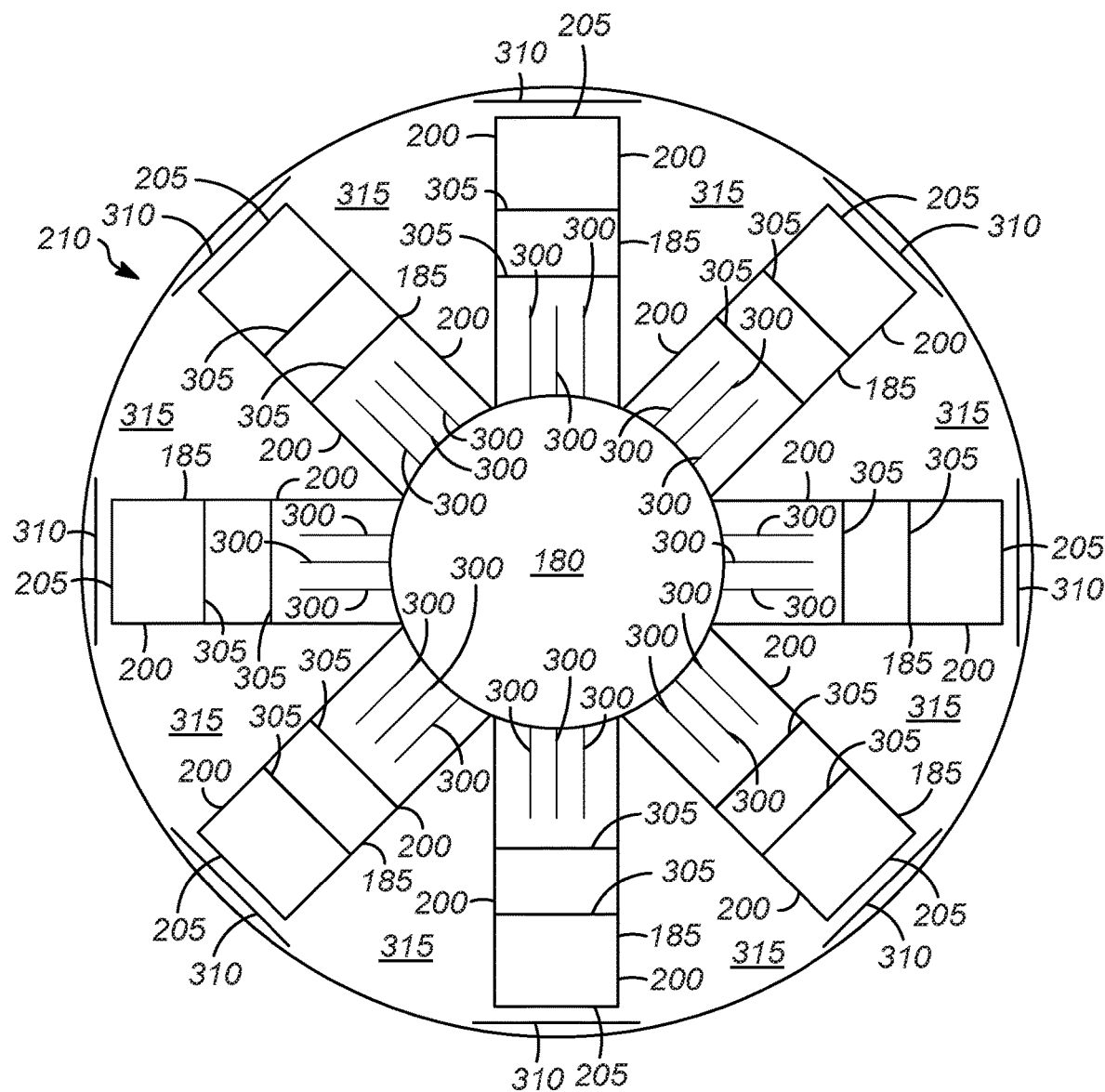
FIG. 2 is a top view of one embodiment of the rough liquid distribution tray of the present invention.

As shown in FIGS. 1 and 2, the quench zone HRI 100 is between the bottom of upper catalyst bed 105 and the top of the lower catalyst bed 110. There is a support system (not shown) at the bottom of the upper catalyst bed 105 for supporting the bed. The HRI 100 includes the collection tray 115, the mixing chamber 130, the ring quench distributor 170, the rough liquid distribution tray 120, and the vapor-liquid distribution tray 125.

In some embodiments, the mixing chamber 130 has an inner wall 135, an outer wall 140, and a top plate 145. The top plate 145 is typically situated on the top of the outer wall 140. The inner wall 135 does not extend up to the top plate 145. In some embodiments, there is no inner wall 135.

The annular zone 165 between the outer wall 140 and the reactor shell 210 is determined by the required space for installing the ring quench distributor 170 and is sized to maximize the diameter of the mixing chamber 130.

The downflow process vapor and liquid from the upper catalyst bed 105 fall onto the top plate 145 and the annular zone 165 between mixing chamber 130 and reactor shell 210. The quench fluid is injected mostly into the annular zone 165. The injectors 167 for the quench fluid are typically directed tangential to the ring quench distributor 170.

The rough liquid distribution tray 120 comprises a central pan 180 and fluid distribution troughs 185. The fluid distribution troughs 185 include bottom plate 195 and side walls 200. The fluid distribution trough 185 may also include one or more open truss mechanical support beams (not shown) which could be connected to the bottom plate 195.

All fluids flow in a swirl pattern inside the mixing chamber 130 towards the center of the collection tray 115 for mixing and down through the central opening 190 in the collection tray 115.

As shown in FIG. 2, the mixed fluids enter into the central pan 180 and then the fluid distribution troughs 185 attached to the central pan 180 for distribution. The diameter of central pan 180 is larger than that of the central opening 190.

The longitudinal baffles 300 extend from the central pan 180 towards the outer end 205 of the fluid distribution troughs 185. The longitudinal baffles 300 may extend any suitable portion of the length of the fluid distribution troughs 185, including the entire length. The longitudinal baffles 300 are typically about 10% to about 50% of the length of the fluid distribution troughs 185, or about 20% to about 30% of the length of the trough. There is at least one longitudinal baffle 300 in each fluid distribution trough 185; there will typically be one, two, or three. The longitudinal baffles 300 are typically about 1 inch in height or more, and can extend any height up to the bottom of the collection tray. They can be solid or perforated. The longitudinal baffles 300 can be attached in any suitable manner, including, but not limited to, welded to the bottom plate 195 of the fluid distribution trough 185.

There can be cross baffles 305 perpendicular to the radial fluid distribution troughs 185. The cross baffles 305 gradually deflect the vapor to the space 315 between the fluid distribution troughs 185 open to vapor-liquid distribution tray 125 below. The cross baffles 305 extend across the fluid distribution troughs 185 between the side walls 200. The cross baffles 305 can extend the entire width of the fluid distribution troughs 185, although they could be narrower or wider if desired. They are typically positioned at locations between about 25% and about 75% of the length of the fluid distribution troughs 185. There is at least one cross baffle 305 on each fluid distribution trough 185; there can be one, two, or three, or more. The height of the cross baffles 305 may be the same or different. For example, the cross baffle 305 nearest the central pan 180 may be shorter than the next one, or they could be the same height. The cross baffles 305 typically extend from the top of the side walls 200 to the bottom of the collection tray 115. They can be solid or perforated. The cross baffles 305 can be attached in any suitable manner, including, but not limited to, welding.

In embodiments with a perforated bottom plate 195, liquid flows down to the vapor-liquid distribution tray 125 through openings (e.g. holes or slots) in the bottom plate 195 of the fluid distribution troughs 185. If the bottom plate 195 is solid, the fluid flows to the outer end 205 and down to the vapor-liquid distribution tray 125. Vapor (gas) flows over the top of the side walls 200 and the outer end 205, as well as the space 315 between the fluid distribution troughs 185.

If there would be any gaps between adjacent fluid distribution troughs 185 on the end attached to the central pan 180, the gaps are closed with a plate or other materials so that fluids exiting the central pan 180 can only flow into the fluid distribution troughs 185 for distribution to vapor-liquid distribution tray 125 below.

The fluid distribution troughs 185 can be any suitable size and shape. The number, size, and shape of the fluid distribution troughs 185 can be designed to accommodate various reactor sizes and vapor and liquid flow rates. Narrow fluid distribution troughs 185 (e.g., less than 30 inches) can be designed for passing through the manway in the reactor for easy installation with minimal sealing required. Multiple narrow fluid distribution troughs 185 also reduce the velocity of the vapor exiting from the fluid distribution troughs 185 through the clearance above the side walls 200 of the fluid distribution troughs 185 to improve the uniformity of fluid distribution to the vapor-liquid distribution tray 125 below.

Typically the number of fluid distribution troughs 185 is between 3 and 12, the width is 12 to 36 inches, and the length extended radially outwardly from central pan 180 to less than 12 inches from reactor shell 210. The side walls 200 are typically parallel. However, other shapes are possible. For example, in some embodiments, the width of the fluid distribution trough 185 at the outer end 205 may be less than the width of the fluid distribution trough 185 at the central pan 180. Alternatively, the width of the fluid distribution trough 185 at the outer end 205 may be greater than the width of the fluid distribution trough 185 at the central pan 180.

The fluid distribution troughs 185 may be constructed with a bottom plate 195 and side walls 200. In some embodiments, there is a wall at the outer end 205 (not shown), especially when the bottom plate 195 has openings. The end attached to the central pan 180 is open so that the fluid mixture can enter the fluid distribution trough 185. In some embodiments, the side walls 200 are sloped from a height close to the spacing between the rough liquid distribution tray 120 and the collection tray 115 (e.g., if the spacing between the trays is 6 inches, the side walls 200 will be 6 inches or less) on the side attached to central pan 180 to about 1 to about 3 inches at the outer end 205 close to the reactor shell 210. Typically, the height of the end wall (if present) of the fluid distribution trough 185 is the same as the side walls 200 where they meet.

As shown in FIGS. 1-2, the end baffle 310 is typically about 1 inch to about 5 inches from the outer end 205 of the fluid distribution trough 185 depending on the liquid volumetric flow and fluid distribution trough 185 design. It typically extends up to about 3 inches above and below the end of the fluid distribution trough 185. The end baffle 310 may be attached to the fluid distribution trough 185, the vapor-liquid distribution tray 125, or both. The end baffle 310 and the outer end of the fluid distribution trough 185 can be straight, or it can be curved to follow the reactor shell 210. The width of the end baffle 310 is preferably wider than the fluid distribution trough 185 so that the liquid can be spread to a wider area on the vapor-liquid distribution tray 125 to minimize disturbance of the liquid pool on the vapor-liquid distribution tray 125.

The description of the process and apparatus of the prior art and this invention are presented with reference to the attached Figures. The Figures are simplified diagrams of the prior art and various embodiments of the present invention and are not intended as an undue limitation on the generally broad scope of the description provided herein and the appended claims. Certain hardware such as valves, pumps, compressors, heat exchangers, instrumentation and controls, have been omitted as not essential to a clear understanding of the invention. The use and application of this hardware is well within the skill of the art.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Specific Embodiments

While the following is described in conjunction with specific embodiments, it will be understood that this description is intended to illustrate and not limit the scope of the preceding description and the appended claims.

A first embodiment of the invention is an apparatus for the mixing and distribution of fluid between catalyst beds comprising a collection tray comprising a central opening, the collection tray in fluid communication with a bottom of an upper catalyst bed; a rough liquid distribution tray comprising a central pan in fluid communication with the central opening of the collection tray and a plurality of fluid distribution troughs in fluid communication with the central pan and extending radially outwardly therefrom, the fluid distribution troughs comprising a bottom, and side walls, each fluid distribution trough having at least one longitudinal baffle extending from the central pan toward an outer end of the fluid distribution trough or at least one cross baffle extending between the side walls or both, the outer end of the fluid distribution trough being spaced apart from a reactor wall; and a vapor-liquid distribution tray in fluid communication with the rough liquid distribution tray and with a top of a lower catalyst bed. An embodiment of the invention is one, any or all of prior embodiments in this paragraph up through the first embodiment in this paragraph wherein the at least one longitudinal baffle has a length of 10% to 50% of a length of the fluid distribution trough. An embodiment of the invention is one, any or all of prior embodiments in this paragraph up through the first embodiment in this paragraph wherein the rough liquid distribution tray has 3 to 12 fluid distribution troughs. An embodiment of the invention is one, any or all of prior embodiments in this paragraph up through the first embodiment in this paragraph wherein each fluid distribution trough has three longitudinal baffles. An embodiment of the invention is one, any or all of prior embodiments in this paragraph up through the first embodiment in this paragraph wherein the at least one cross baffle is positioned at a location between 25% and 75% of a length of the fluid distribution trough. An embodiment of the invention is one, any or all of prior embodiments in this paragraph up through the first embodiment in this paragraph wherein each fluid distribution trough has three or less cross baffles. An embodiment of the invention is one, any or all of prior embodiments in this paragraph up through the first embodiment in this paragraph wherein the at least one longitudinal baffle is perforated or the at least one cross baffle is perforated or both. An embodiment of the invention is one, any or all of prior embodiments in this paragraph up through the first embodiment in this paragraph wherein the bottom of the fluid distribution troughs has openings therethrough. An embodiment of the invention is one, any or all of prior embodiments in this paragraph up through the first embodiment in this paragraph wherein the bottom of the fluid distribution troughs is solid. An embodiment of the invention is one, any or all of prior embodiments in this paragraph up through the first embodiment in this paragraph wherein the fluid distribution trough further comprising an end wall connected to the side walls. An embodiment of the invention is one, any or all of prior embodiments in this paragraph up through the first embodiment in this paragraph wherein the fluid distribution trough further comprising an end baffle positioned between the outer end of the fluid distribution trough and the reactor wall.

A second embodiment of the invention is a device for the mixing and distribution of fluid between catalyst beds comprising a collection tray comprising a central opening, the collection tray in fluid communication with a bottom of an upper catalyst bed; a rough liquid distribution tray comprising a central pan in fluid communication with the central opening of the collection tray and a plurality of fluid distribution troughs in fluid communication with the central pan and extending radially outwardly therefrom, the fluid distribution troughs comprising a bottom, and side walls, each fluid distribution trough having at least one longitudinal baffle extending from the central pan toward an outer end of the fluid distribution trough and at least one cross baffle extending between the side walls, the side walls sloping downward from the central pan to the outer end, the outer end of the fluid distribution trough being spaced apart from a reactor wall; and a vapor-liquid distribution tray in fluid communication with the rough liquid distribution tray and with a top of a lower catalyst bed. An embodiment of the invention is one, any or all of prior embodiments in this paragraph up through the second embodiment in this paragraph wherein the at least one longitudinal baffle has a length of 10% to 50% of a length of the fluid distribution trough. An embodiment of the invention is one, any or all of prior embodiments in this paragraph up through the second embodiment in this paragraph wherein each fluid distribution trough has three longitudinal baffles. An embodiment of the invention is one, any or all of prior embodiments in this paragraph up through the second embodiment in this paragraph wherein the at least one cross baffle is positioned at a location between 25% and 75% of a length of the fluid distribution trough. An embodiment of the invention is one, any or all of prior embodiments in this paragraph up through the second embodiment in this paragraph wherein each fluid distribution trough has three or less cross baffles. An embodiment of the invention is one, any or all of prior embodiments in this paragraph up through the second embodiment in this paragraph wherein the bottom of the fluid distribution troughs has openings therethrough. An embodiment of the invention is one, any or all of prior embodiments in this paragraph up through the second embodiment in this paragraph wherein the bottom of the fluid distribution troughs is solid. An embodiment of the invention is one, any or all of prior embodiments in this paragraph up through the second embodiment in this paragraph wherein the fluid distribution trough has an end wall at the outer end.

A third embodiment of the invention is a device for the mixing and distribution of fluid between catalyst beds comprising a collection tray comprising a central opening, the collection tray in fluid communication with a bottom of an upper catalyst bed; a rough liquid distribution tray comprising a central pan in fluid communication with the central opening of the collection tray and a plurality of fluid distribution troughs in fluid communication with the central pan and extending radially outwardly therefrom, the fluid distribution trough comprising a bottom, and side walls, each fluid distribution trough having at least one of at least one longitudinal baffle extending from the central pan toward an outer end of the fluid distribution trough; at least one cross baffle extending between the side walls; and an end baffle positioned between the outer end of the fluid distribution trough end and a reactor wall; wherein the at least one longitudinal baffle has a length of 10% to 50% of a length of the fluid distribution trough, wherein the at least one cross baffle is positioned at a location between 25% and 75% of the length of the fluid distribution trough, the side walls sloping downward from the central pan to the outer end of the fluid distribution trough, the end of the fluid distribution trough being spaced apart from the reactor wall; and a vapor-liquid distribution tray in fluid communication with the rough liquid distribution tray and with a top of a lower catalyst bed.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A device for the mixing and distribution of fluid between catalyst beds comprising:
    a collection tray comprising a central opening, the collection tray in fluid communication with a bottom of an upper catalyst bed;
    a rough liquid distribution tray comprising a central pan in fluid communication with the central opening of the collection tray and a plurality of fluid distribution troughs in fluid communication with the central pan and extending radially outwardly therefrom, the fluid distribution troughs comprising a bottom, and side walls, each fluid distribution trough having at least one longitudinal baffle extending from the central pan toward an outer end of the fluid distribution trough or at least one cross baffle extending between the side walls or both, the outer end of the fluid distribution trough being spaced apart from a reactor wall; and
    a vapor-liquid distribution tray in fluid communication with the rough liquid distribution tray and with a top of a lower catalyst bed.

2. The device of claim 1 wherein the at least one longitudinal baffle has a length of 10% to 50% of a length of the fluid distribution trough.

3. The device of claim 1 wherein the rough liquid distribution tray has 3 to 12 fluid distribution troughs.

4. The device of claim 1 wherein each fluid distribution trough has three longitudinal baffles.

5. The device of claim 1 wherein the at least one cross baffle is positioned at a location between 25% and 75% of a length of the fluid distribution trough.

6. The device of claim 1 wherein each fluid distribution trough has three or less cross baffles.

7. The device of claim 1 wherein the at least one longitudinal baffle is perforated or the at least one cross baffle is perforated or both.

8. The device of claim 1 wherein the bottom of the fluid distribution troughs has openings therethrough.

9. The device of claim 1 wherein the bottom of the fluid distribution troughs is solid.

10. The device of claim 8 wherein the fluid distribution trough further comprising an end wall connected to the side walls.

11. The device of claim 1 wherein the fluid distribution trough further comprising an end baffle positioned between the outer end of the fluid distribution trough and the reactor wall.

12. A device for the mixing and distribution of fluid between catalyst beds comprising:
    a collection tray comprising a central opening, the collection tray in fluid communication with a bottom of an upper catalyst bed;
    a rough liquid distribution tray comprising a central pan in fluid communication with the central opening of the collection tray and a plurality of fluid distribution troughs in fluid communication with the central pan and extending radially outwardly therefrom, the fluid distribution troughs comprising a bottom, and side walls, each fluid distribution trough having at least one longitudinal baffle extending from the central pan toward an outer end of the fluid distribution trough and at least one cross baffle extending between the side walls, the side walls sloping downward from the central pan to the outer end, the outer end of the fluid distribution trough being spaced apart from a reactor wall; and
    a vapor-liquid distribution tray in fluid communication with the rough liquid distribution tray and with a top of a lower catalyst bed.

13. The device of claim 12 wherein the at least one longitudinal baffle has a length of 10% to 50% of a length of the fluid distribution trough.

14. The device of claim 12 wherein each fluid distribution trough has three longitudinal baffles.

15. The device of claim 12 wherein the at least one cross baffle is positioned at a location between 25% and 75% of a length of the fluid distribution trough.

16. The device of claim 12 wherein each fluid distribution trough has three or less cross baffles.

17. The device of claim 12 wherein the bottom of the fluid distribution troughs has openings therethrough.

18. The device of claim 12 wherein the bottom of the fluid distribution troughs is solid.

19. The device of claim 17 wherein the fluid distribution trough has an end wall at the outer end.

20. A device for the mixing and distribution of fluid between catalyst beds comprising:
    a collection tray comprising a central opening, the collection tray in fluid communication with a bottom of an upper catalyst bed;
    a rough liquid distribution tray comprising a central pan in fluid communication with the central opening of the collection tray and a plurality of fluid distribution troughs in fluid communication with the central pan and extending radially outwardly therefrom, the fluid distribution trough comprising a bottom, and side walls, each fluid distribution trough having at least one of:
        at least one longitudinal baffle extending from the central pan toward an outer end of the fluid distribution trough, wherein the at least one longitudinal baffle has a length of 10% to 50% of a length of the fluid distribution trough;
        at least one cross baffle extending between the side walls, wherein the at least one cross baffle is positioned at a location between 25% and 75% of the length of the fluid distribution trough; and
        an end baffle positioned between the outer end of the fluid distribution trough end and a reactor wall;
    the side walls sloping downward from the central pan to the outer end of the fluid distribution trough, the end of the fluid distribution trough being spaced apart from the reactor wall; and
    a vapor-liquid distribution tray in fluid communication with the rough liquid distribution tray and with a top of a lower catalyst bed.

* * * * *